No. 659,439. Patented Oct. 9, 1900.
F. J. ERRICK & F. X. BATT.
BICYCLE LOCK.
(Application filed Apr. 2, 1900.)
(No Model.)
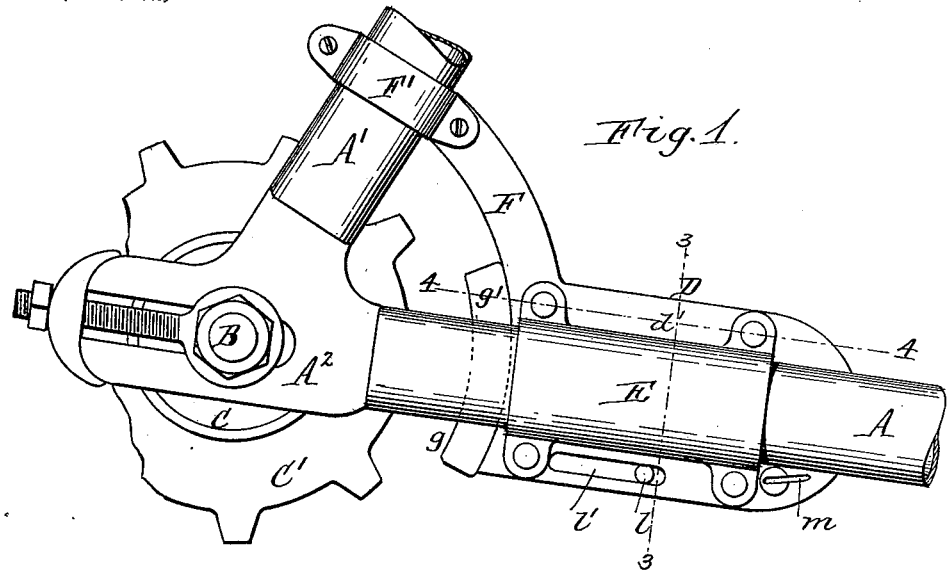
Fig. 1.
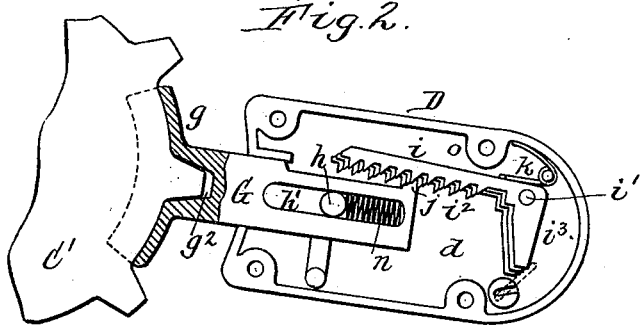
Fig. 2.
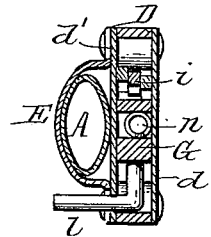
Fig. 3.
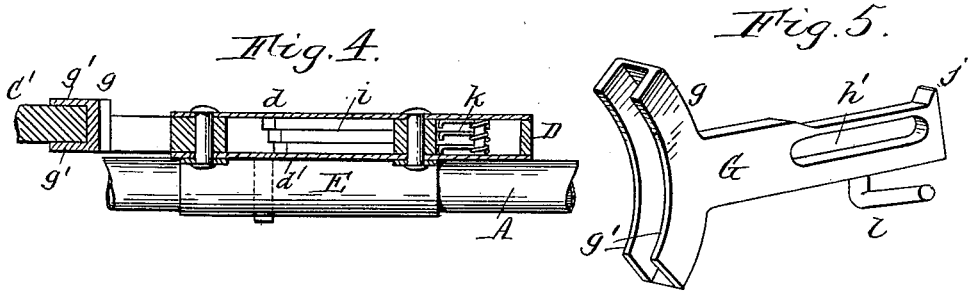
Fig. 4.
Fig. 5.
Witnesses:
C. A. Volk.
F. F. Schurziger.
Frank J. Errick
Frank X. Batt } Inventors
By Wilhelm & Bonner. Attorneys.
THE NORRIS PETERS CO., PHOTO-LITHO., WASHINGTON, D. C.

UNITED STATES PATENT OFFICE.

FRANK J. ERRICK, OF NORTH TONAWANDA, AND FRANK X. BATT, OF TONAWANDA, NEW YORK.

BICYCLE-LOCK.

SPECIFICATION forming part of Letters Patent No. 659,439, dated October 9, 1900.

Application filed April 2, 1900. Serial No. 11,197. (No model.)

*To all whom it may concern:*

Be it known that we, FRANK J. ERRICK, residing at North Tonawanda, Niagara county, and FRANK X. BATT, residing at Tonawanda, Erie county, New York, citizens of the United States, have invented new and useful Improvements in Bicycle-Locks, of which the following is a specification.

This invention relates to that class of velocipede-locks which are permanently attached to the frame of the bicycle or other velocipede, and more particularly to a lock of this kind which is adapted to engage with the rear sprocket-wheel of a bicycle.

The objects of our invention are to provide a reliable and inexpensive lock which can be readily operated and to so construct the lock that the locking-bolt can be projected more or less to compensate for the adjustment of the sprocket-wheel.

In the accompanying drawings, Figure 1 is a side elevation of our improved lock and the adjacent rear portion of the bicycle-frame to which the same is secured. Fig. 2 is a detached side elevation of the lock and a portion of the rear sprocket-wheel, the front plate of the lock-case being removed to expose the interior of the lock and the head of the locking-bolt being shown in section. Fig. 3 is a transverse section in line 3 3, Fig. 1. Fig. 4 is a longitudinal section in line 4 4, Fig. 1, showing the bolt in engagement with the sprocket-wheel. Fig. 5 is a detached perspective view of the locking-bolt.

Like letters of reference refer to like parts in the several figures.

A is one of the arms of the lower rear fork of a bicycle, A' the adjacent stay member, and $A^2$ the slotted lug or fitting connecting said members.

B is the rear axle, adjustably secured in the rear-fork lugs; C, the hub of the rear wheel, and C' the sprocket or driving wheel mounted thereon.

D is the skeleton frame of the lock-case, and $d\,d'$ are the plates secured to opposite sides of the frame by rivets or screws. The lock is arranged on the inner side of the fork-arm A immediately in front of the sprocket-wheel C' and is firmly secured in place by a clip E, secured to the outer side of the lock-case and embracing said fork-arm and an arm F, which extends upwardly and rearwardly from the case and is fastened at its upper end to the stay member A' by a clip F'. By this attachment the lock is firmly secured to the frame and held against lengthwise displacement on the fork by the arm F.

G is a locking-bolt which slides lengthwise in the lock-case and which extends rearwardly through an opening formed in the rear end thereof. The bolt is provided at its front end with a curved or segmental locking-head $g$, which is adapted to interlock with the opposing front portion of the sprocket-wheel C'. This head is provided with parallel side flanges $g'$, which extend forwardly from the head and which are adapted to bear against opposite sides of the sprocket-wheel. These flanges form, with the curved portion $g$, a channeled or trough-shaped locking-head which embraces both the sides and the edge of the sprocket-wheel, thereby reliably interlocking the bolt with the sprocket-wheel when the bolt is in its projected position and preventing unauthorized persons from displacing the bolt laterally out of engagement with the sprocket. The bottom of the channeled locking-head is curved concentrically with the edge of the sprocket-wheel, so as to fit closely against the same, and is provided with a central socket or recess $g^2$, which receives one of the teeth of the sprocket-wheel. The locking-head is preferably made of sufficient length to bridge the space between the two teeth of the sprocket-wheel on opposite sides of the tooth which enters the socket of the head, as shown. By providing the locking-head with this socket the sprocket-wheel is locked with additional security.

The lock is arranged at such a distance from the sprocket-wheel that in the retracted position of the locking-bolt, in which its head bears against the rear end of the case, the bolt fully clears the teeth of the sprocket-wheel, as shown in Fig. 1. The bolt is guided by a transverse pin $h$, which projects inwardly from one of the side plates $d\,d'$ and enters a longitudinal slot $h'$ of the bolt. Any suitable locking devices or tumblers may be combined with the sliding bolt G for locking the same in its projected position; but we prefer to employ the devices shown in the drawings for this purpose. These consist of two or more elbow-shaped pawls or tumblers $i$, which swing on a horizontal pivot-pin $i'$, secured to the lock-case. The horizontal arms of these tumblers are provided with ratchet-teeth $i^2$, which are adapted to interlock with a similar tooth $j$, formed at the inner end of the locking-bolt. The tumblers are held in engagement with the toothed bolt by suitable springs $k$. The rear edges of the tumbler-teeth are inclined, and the front edge of the bolt-tooth $j$ is correspondingly beveled, so that the bolt can be withdrawn without restraint until its head $g$ bears against the edge of the sprocket-wheel, while the opposite edges of said teeth are abrupt, so that the bolt is automatically locked against inward movement in all positions thereof. The teeth of the several tumblers are arranged in stepped order or so that the teeth of each tumbler are slightly in advance of those of the next tumbler. By this arrangement the teeth can be made sufficiently large or coarse to afford the desired strength, and yet permit of a comparatively-fine adjustment or variation in the extent of withdrawal of the bolt. This is necessary to enable the locking-bolt to follow the adjustment of the sprocket-wheel incident to taking up wear or looseness of the driving-chain.

The locking-bolt is conveniently projected by a knob or pin $l$, secured to its outer side and projecting through a slot $l'$, formed in the outer wall of the lock-case. The bolt is released for unlocking the sprocket-wheel by a suitable key, which is passed through a slot $m$, formed in the front side of the case, and which engages against the rear edge of the depending arms $i^3$ of the tumblers $i$, as shown by dotted lines in Fig. 2, thereby swinging the toothed arms of the tumblers upwardly out of engagement with the locking-bolt.

$n$ is a spring which automatically withdraws the locking-bolt from the sprocket-wheel when released. This spring is arranged in the slot $h'$ of the bolt between the inner end of the slot and the guide-pin $h$ and is compressed when the bolt is projected.

The rear edges of the releasing-arms of the tumblers $i$ are arranged in stepped order or so as to extend beyond one another, as shown in Fig. 2, and the key of the lock, which is not shown in the drawings, is constructed accordingly in a well-known manner, so as to operate all of the tumblers simultaneously.

The lug $o$ of the lock-case, located above the tumblers, forms a stop which limits the upward movement of the toothed arms of the tumblers. This stop is arranged to permit just sufficient clearance between the tooth of the locking-bolt and the teeth of the tumblers to release the bolt, and the rear edges of the releasing-arms of the tumblers are offset a distance corresponding to the stroke of the tumblers. If it be attempted to throw the tumblers with an ordinary flat bar, only that tumbler whose releasing-arm extends rearmost will be raised, and as soon as said tumbler strikes the stop $o$ its releasing-arm in turn acts as a stop, which prevents the bar from swinging the remaining tumblers on their pivots, thus rendering it impossible to throw all of the tumblers except with the proper key.

We claim as our invention—

1. In a velocipede-lock, the combination with a case adapted to be rigidly secured to a velocipede-frame, of a locking-bolt guided in said case and having a concave head which is adapted to bear against the edge of a sprocket-wheel, and which is provided with forwardly-extending vertical flanges which are adapted to embrace the sides of the sprocket-wheel, and means for retaining said bolt in its projected position, substantially as set forth.

2. In a velocipede-lock, the combination with a case adapted to be rigidly secured to a velocipede-frame, of a sliding locking-bolt guided in the case and having a curved head which is constructed to bear against the edge of a sprocket-wheel and which is provided with a socket adapted to receive a tooth of the sprocket-wheel, and on opposite sides of said socket with forwardly-extending flanges adapted to embrace the sides of the sprocket-wheel, and means for retaining the locking-bolt in its projected position, substantially as set forth.

3. In a velocipede-lock, the combination with a case, having an attachment for securing the same to a velocipede-frame, of a sliding bolt guided in the case and provided with a locking-tooth, elbow-shaped tumblers pivoted side by side within the casing and having their horizontal arms provided with teeth which interlock with the tooth of the bolt, and a stop arranged to limit the releasing movement of said tumblers, the depending arms of the tumblers being offset rearwardly one beyond another a distance corresponding to the throw of the tumblers, substantially as set forth.

4. In a velocipede-lock, the combination with a case having an attachment for securing the same to a velocipede-frame, of a sliding bolt guided in the case and provided with a locking-tooth, a plurality of tumblers pivoted side by side in the casing and having toothed arms which interlock with the tooth of the sliding bolt and actuating-arms which are offset one beyond another, and a stop arranged to limit the releasing movement of said tumblers, substantially as set forth.

5. In a velocipede-lock, the combination with a case having an attachment for securing the same to a velocipede-frame, of a sliding bolt guided in the case and provided with a locking-tooth, a plurality of tumblers pivoted side by side in the case and having their horizontal arms provided with ratchet-teeth which interlock with the tooth of the bolt, the teeth of the several tumblers being arranged in stepped order, and springs for holding said tumblers in engagement with the toothed locking-bolt, substantially as set forth.

6. In a velocipede-lock, the combination with a case having an attachment for securing the same to a velocipede-frame, of a sliding bolt guided in the case and provided with a locking-tooth, and a shifting-pin which passes through a slot of the case, of elbow-shaped tumblers pivoted side by side within the casing and having their horizontal arms provided with ratchet-teeth which interlock with the tooth of the bolt, the teeth of the several tumblers being arranged in stepped order and the depending arms of the elbow-shaped tumblers being arranged in similar order, and springs which hold said tumblers in engagement with the toothed locking-bolt, substantially as set forth.

Witness our hands this 23d day of March, 1900.

FRANK J. ERRICK.
    FRANK X. BATT.

Witnesses:
 CARL F. GEYER,
 CLAUDIA M. BENTLEY.